(12) United States Patent
Chamoun et al.

(10) Patent No.: US 11,619,794 B2
(45) Date of Patent: Apr. 4, 2023

(54) SYSTEM FOR INSTALLING OPTICAL FIBER

(71) Applicant: Palo Alto Research Center Incorporated, Palo Alto, CA (US)

(72) Inventors: Jacob N. Chamoun, Somerville, MA (US); Qiushu Chen, San Jose, CA (US); Peter Kiesel, Palo Alto, CA (US); Kyle Arakaki, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/235,360

(22) Filed: Apr. 20, 2021

(65) Prior Publication Data
US 2022/0334334 A1 Oct. 20, 2022

(51) Int. Cl.
*G02B 6/44* (2006.01)
*G02B 6/02* (2006.01)
*G02B 6/46* (2006.01)
*G01B 11/16* (2006.01)
*G01H 9/00* (2006.01)
*G01K 11/3206* (2021.01)

(52) U.S. Cl.
CPC ....... *G02B 6/4457* (2013.01); *G02B 6/02209* (2013.01); *G02B 6/4453* (2013.01); *G02B 6/46* (2013.01); *G01B 11/165* (2013.01); *G01H 9/004* (2013.01); *G01K 11/3206* (2013.01)

(58) Field of Classification Search
CPC .......................................... G02B 6/4452–4458
See application file for complete search history.

(56) References Cited

U.S. PATENT DOCUMENTS

| | | | |
|---|---|---|---|
| 6,668,105 B2 | 12/2003 | Chen et al. | |
| 7,315,681 B2* | 1/2008 | Kewitsch | G02B 6/4457 |
| | | | 385/135 |
| 7,358,858 B2 | 4/2008 | Ozawa et al. | |
| 8,474,742 B2 | 7/2013 | Smrha | |
| 10,838,163 B2 | 11/2020 | Gronvall | |
| 2002/0117571 A1 | 8/2002 | Scott et al. | |
| 2008/0187276 A1* | 8/2008 | Roberts | G02B 6/3608 |
| | | | 385/114 |

(Continued)

FOREIGN PATENT DOCUMENTS

| | | | | |
|---|---|---|---|---|
| CA | 2871098 C | * | 8/2018 | ........... G02B 6/3612 |
| CN | 104655315 A | * | 5/2015 | |

(Continued)

OTHER PUBLICATIONS

European Patent Application No. 22165807.3, Extended European Search Report dated Aug. 25, 2022; 6 pages.

(Continued)

*Primary Examiner* — Charlie Y Peng
(74) *Attorney, Agent, or Firm* — Mueting Raasch Group

(57) ABSTRACT

An apparatus has a cassette configured to hold optical fiber comprising one or more optical sensors. The cassette has a spool configured to one or more of extract and retract the optical fiber from the cassette. A pre-strain mechanism is configured to apply a predetermined pre-strain to the one or more optical sensors. An optical fiber installation tool is configured to mount the optical fiber comprising the one or more pre-strained optical sensors to a surface.

19 Claims, 10 Drawing Sheets

(56) References Cited

U.S. PATENT DOCUMENTS

| | | |
|---|---|---|
| 2014/0219615 A1 | 8/2014 | Petersen et al. |
| 2018/0066509 A1 * | 3/2018 | Fouda .................... E21B 47/01 |
| 2019/0062100 A1 | 2/2019 | Mertesdorf |

FOREIGN PATENT DOCUMENTS

| | | | |
|---|---|---|---|
| CN | 208 530 994 U | 2/2019 | |
| CN | 111812785 | 10/2020 | |
| CN | 112217144 | 1/2021 | |
| EP | 2247971 | 11/2010 | |
| FR | 2630419 | 10/1989 | |
| KR | 2010-0048557 A | 5/2010 | |
| WO | WO-03056376 A1 * | 7/2003 | ............. B65H 59/00 |
| WO | 2005031401 | 4/2005 | |

OTHER PUBLICATIONS

European Patent Application No. 22165822.2, Extended European Search Report dated Aug. 19, 2022; 9 pages.

\* cited by examiner

SYSTEM FOR INSTALLING OPTICAL FIBER

TECHNICAL FIELD

This application relates generally to techniques for structural health monitoring. The application also relates to components, devices, systems, and methods pertaining to such techniques.

BACKGROUND

Fiber optic (FO) sensors can be used for detecting parameters such as strain, temperature, pressure, current, voltage, chemical composition, and vibration. FO sensors are attractive components because they are thin, lightweight, sensitive, robust to harsh environments, and immune to electromagnetic interference (EMI) and electrostatic discharge. FO sensors can be arranged to simultaneously measure multiple parameters distributed in space with high sensitivity in multiplexed configurations over long optical fiber cables. One example of how this can be achieved is through fiber Bragg grating (FBG) sensors. A FBG sensor is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and/or temperature, etc.) that changes the periodicity of the grating and/or the index of refraction of the fiber. Thus, FBG sensors rely on the detection of small wavelength changes in response to stimuli of interest. In some implementations, FO sensors can be attached to structures and operated to detect parameters, e.g., strain, temperature, vibration, related to the health of the structures.

SUMMARY

Embodiments described herein involve an apparatus comprising a cassette configured to hold optical fiber comprising one or more optical sensors. The cassette comprises a spool configured to one or more of extract and retract the optical fiber from the cassette. A pre-strain mechanism is configured to apply a predetermined pre-strain to the one or more optical sensors. An optical fiber installation tool is configured to mount the optical fiber comprising the one or more pre-strained optical sensors to a surface.

Embodiments involve a method of installing optical fiber on a structure. The method comprises loading optical fiber comprising one or more optical sensors on a cassette. The optical fiber is unspooled as the cassette moves along a surface of the structure. A condition of the optical fiber is monitored as it is being unspooled. It is determined whether an installation point is approaching based on the monitoring. A segment of the optical fiber is installed to the surface based on a determination that the installation point is approaching.

Embodiments involve a cassette configured to hold optical fiber comprising one or more optical sensors. The cassette comprises a spool configured to one or more of extract and retract the optical fiber from the cassette. A pre-strain mechanism is configured to apply a predetermined pre-strain to the one or more optical sensors. An optical fiber installation tool is configured to mount the optical fiber comprising the one or more pre-strained optical sensors to a surface.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Fiber optic (FO) sensors have been explored considerably for downhole sensing in oil and gas production and in some academic studies for structural health monitoring. Parameters including strain, temperature, pressure, current, voltage, and/or chemical composition can be sensed by FO sensors. FO sensors offer many advantages over their electrical counterparts. They are thin (100-200 µm diameter, for example), lightweight, sensitive, robust to harsh environments, and immune to electromagnetic interference (EMI) and electrostatic discharge.

Some embodiments disclosed herein involve apparatuses for attaching FO sensors to structures. Fiber optic sensors can be deployed on various types of structures, e.g., bridges, roadways, railways, and electrical devices such as transformers, to monitor the structural health of the structures. The disclosed embodiments can facilitate mounting FO sensors to the structures in such a way that strain from the structures is transmitted to the sensors. The approaches discussed herein provide for attachment of FO sensors that is flexible enough to attach the FO sensors to a variety of different substrates, e.g. concrete, metal, and wood. Repeatability of the attachment is desired so that at least some or most of the FO sensors have the same pre-strain once attached. The disclosed attachment approaches can be simple and rapid to perform to facilitate the deployment of multiple FO sensors on a structure. Installing optical fibers on structures involves extensive fiber handling during the install. Optical fibers are fragile, and breaks and/or tangles cost time, which is detrimental e.g. because roads must be shut down to service a structure. According to various configurations, the sensors may be fiber Bragg grating (FBG) strain sensors, Fabry Perot sensors, and/or other interferometric optical sensors. In some cases, the sensors may include one or more of electrical and/or resistive sensors, mechanical sensors, and/or other types of strain gages. In some cases, a combination of different types of sensors may be used.

Figure 1:
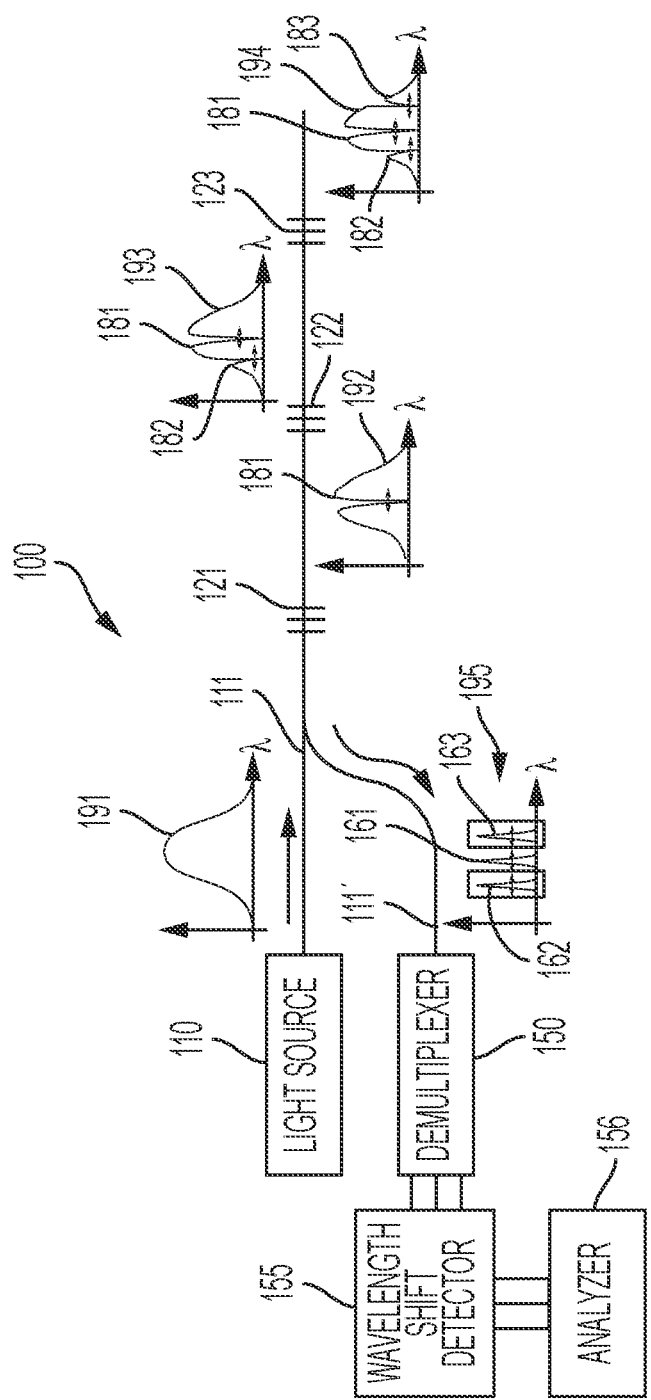
FIG. 1 shows a wavelength multiplexed system can use a compensated sensor array comprising multiple FBG sensors disposed on a single optical fiber in accordance with embodiments described herein.

Uniquely, FO sensors can simultaneously measure multiple parameters distributed in space with high sensitivity in multiplexed configurations over long FO cables. One example of how this can be achieved is through fiber Bragg grating (FBG) sensors. An FBG is formed by a periodic modulation of the refractive index along a finite length (typically a few mm) of the core of an optical fiber. This pattern reflects a wavelength, called the Bragg wavelength, determined by the periodicity of the refractive index profile. The Bragg wavelength is sensitive to external stimulus (strain and temperature, etc.) that change the periodicity of the grating and/or the index of refraction of the fiber. Thus FBG sensors rely on the detection of small wavelength changes in response to stimuli of interest. An example of having multiple FBG sensors along one fiber cable is shown in FIG. 1. A broadband light source is used and multiple FBG sensor elements, each tuned to be primarily reflective to a different wavelength are on the same optical fiber bus at different distances. Each FBG is designated to measure a different (combination of) parameter(s). Noticeably, installing such a long fiber cable with multiple sensors in the field is not a trivial task. Fiber sensors are typically very delicate and fragile thus should be handled carefully. Each sensor should be installed reliably, free from manual error. Fiber segment between two sensing points should be properly handled to avoid sag or kink that can introduce optical power loss and/or reduce the robustness of the sensing fiber in the field.

FO sensors can simultaneously measure multiple parameters distributed in space with high sensitivity in multiplexed configurations over long FO cables. One example of how this can be achieved is through fiber Bragg grating (FBG) sensors. FIG. 1 shows a wavelength multiplexed system 100 can use a compensated sensor array comprising multiple FBG sensors 121, 122, 123 disposed on a single optical fiber 111. The sensors 121-123 may be arranged to sense parameters including one or more of temperature, strain, and/or vibration, for example. As indicated in FIG. 1, input light is provided by the light source 110, which may comprise or be a light emitting diode (LED) or superluminescent laser diode (SLD), for example. The spectral characteristic (intensity vs. wavelength) of broadband light is shown by inset graph 191. The intensity is highest near the middle of the spectrum and falls off at the spectrum edges. The sensors 121, 122, 123 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 111 to the first FBG sensor 121. The first FBG sensor 121 reflects a portion of the light in a first wavelength band having a central wavelength, $\lambda 1$. Light having wavelengths other than within the first wavelength band is transmitted through the first FBG sensor 121 to the second FBG sensor 122. The spectral characteristic of the light transmitted to the second FBG sensor 122 is shown in inset graph 192 and exhibits a notch 181 at the first wavelength band centered at $\lambda 1$ indicating that light in this wavelength band is reflected by the first sensor 121.

The second FBG sensor 122 reflects a portion of the light in a second wavelength band having a central wavelength, $\lambda 2$. Light that is not reflected by the second FBG sensor 122 is transmitted through the second FBG sensor 122 to the third FBG sensor 123. The spectral characteristic of the light transmitted to the third FBG sensor 123 is shown in inset graph 193 and includes notches 181, 182 centered at $\lambda 1$ and $\lambda 2$.

The third FBG sensor 123 reflects a portion of the light in a third wavelength band having a central or peak wavelength, $\lambda 3$. Light that is not reflected by the third FBG sensor 123 is transmitted through the third FBG sensor 123. The spectral characteristic of the light transmitted through the third FBG sensor 823 is shown in inset graph 194 and includes notches 181, 182, 183 centered at $\lambda 1, \lambda 2$, and $\lambda 3$.

Light in wavelength bands 161, 162, 163, having central wavelengths $\lambda 1, \lambda 2$ and $\lambda 3$ (illustrated in inset graph 195) is reflected by the first, second, or third FBG sensors 121, 122, 123, respectively, along the FO cables 111 and 111' to an the optical wavelength demultiplexer 150. Compensating input characteristics of sensors 121, 122, 123 cause the difference in the intensity peaks of the light 161, 162, 163 to be reduced when compared to the intensity peaks from an uncompensated sensor array.

From the wavelength demultiplexer 150, the sensor light 161, 162, 163 may be routed to a wavelength shift detector 155 that generates an electrical signal responsive to shifts in the central wavelengths $\lambda 1, \lambda 2$ and $\lambda 3$ and/or wavelength bands of the sensor light. The wavelength shift detector 155 receives reflected light from each of the sensors and generates corresponding electrical signals in response to the shifts in the central wavelengths $\lambda 1, \lambda 2$ and $\lambda 3$ or wavelength bands of the light reflected by the sensors 121-123. The analyzer 156 may compare the shifts to a characteristic base wavelength (a known wavelength) to determine whether changes in the values of the parameters sensed by the sensors 121-123 have occurred. The analyzer 156 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

In the last few years the quality and cost of fiber optic sensors and their readout technologies have significantly improved. To realize now further acceptance of FO sensing e.g., for structural health monitoring or industrial process control, improvement regarding handling, installing and bonding fiber sensors are needed to allow for simple, reliable and robust sensor installation in the field.

Embodiments described herein involve techniques for controlled and (semi)automatic installation and bonding procedures that will enable even unskilled labor to safely and reliably install FO sensors onto surfaces in the field. An integrated system is described that installs FO sensors to surface in an automatic or semi-automatic way. Different components for fiber handling and fiber installation synergize to adapt to limited working conditions in the field while maintaining reliable sensing performance and system robustness.

Embodiments described herein describe the field installation difficulties in a systematic way. The system combines functions of fiber spooling and unspooling, sensing point identification, sensing point installation, and non-sensing segment management. The system accommodates to installation of FO sensors in one fiber spool over large space. The system accommodates to installation of FO sensors where working space for operators are limited, such as on a boom lift.

Figure 2:
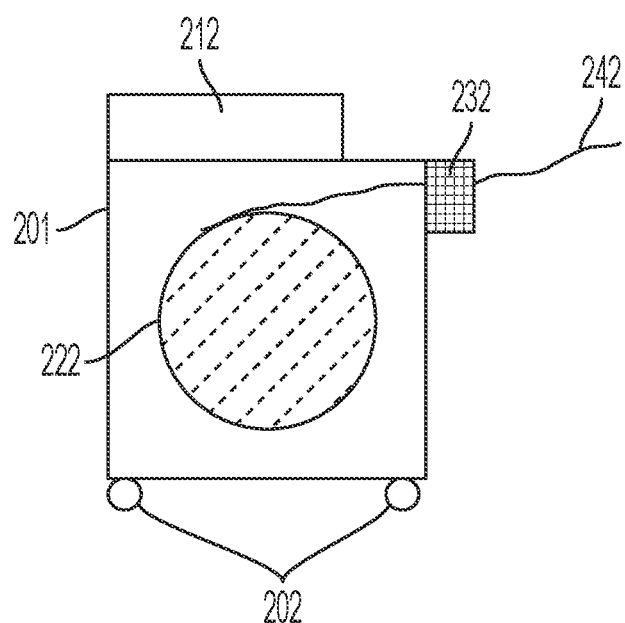
FIG. 2 illustrates an example cassette 201 for handling optical fiber 242 in accordance with embodiments described herein.

According to various configurations, a cassette may be used for handling optical fiber having a plurality of sensors while it is being installed on a surface. FIG. 2 illustrates an example cassette 201 for handling optical fiber 242 in accordance with embodiments described herein. Embodiments described herein involve a cassette 201 that houses an optical fiber spool 222 inside a cassette body in accordance with embodiments described herein. A cassette in accordance with embodiments described herein is described in further detail in U.S. App. No. 17/235,138, which is incorporated by reference in its entirety. The cassette may have one or more additional mechanisms that may be useful for the installation of optical fiber sensors. For example, the cassette has one or more mounting points 202 configured to allow mounting of the cassette during installation of the optical fiber. For example, the mounting points 202 may include one or more of a magnet and a carabiner attachment point.

The cassette 201 may include an optical fiber monitor 232 may be disposed at an optical fiber exit point of the cassette 201. The optical fiber monitor 232 may be configured to monitor at least one parameter of the optical fiber 242 as the optical fiber is extracted from the cassette. For example, the at least one parameter includes a spooling length, a spooling condition, a total length dispensed, an approximate distance to an optical sensor, a fiber tension, and/or a fiber integrity.

According to various embodiments, as the optical fiber 242 is extracted from the cassette 201, the optical fiber monitor 232 is configured to detect the presence of markers and thus determine the location of the one or more sensors along the optical fiber 242. In some cases, the optical fiber monitor 232 may be able to determine a total length of optical fiber dispensed. A spool monitor 212 may be disposed on or near the cassette. The spool monitor 212 may be configured to display one or more of the parameters monitored by the optical fiber monitor 232. For example, the spool monitor 212 may be configured to display the total amount of optical fiber 242 dispensed and/or the distance to the next optical sensor. A fiber monitor is described in further detail in U.S. App. No. 17/235,311, which is incorporated by reference in its entirety.

Figure 3:
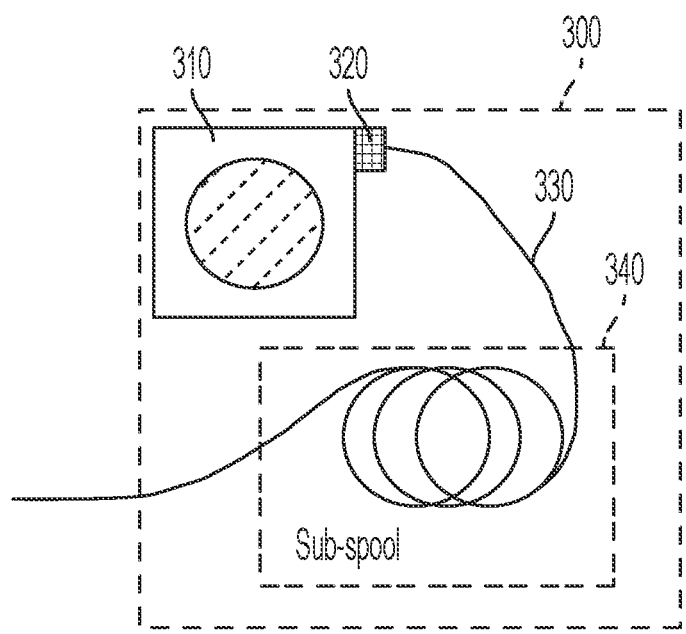
FIG. 3 shows a sub-spooling system in accordance with embodiments described herein.

According to various embodiments, a sub-spooling system 340 can be included in the system 300 which spools fiber 330 released from the original cassette 310 into a sub-spool system 340 as shown in FIG. 3. According to various embodiments, the sub-spool has a defined radius. For example, the sub-spool may have a radius in a range of about 1 cm to about 10 cm. The sub-spool can then be installed onto the surface as an integral that will benefit sag management for fibers between two sensing points. According to various embodiments, a fiber monitor 320 may be included in the system 300.

Figure 4:
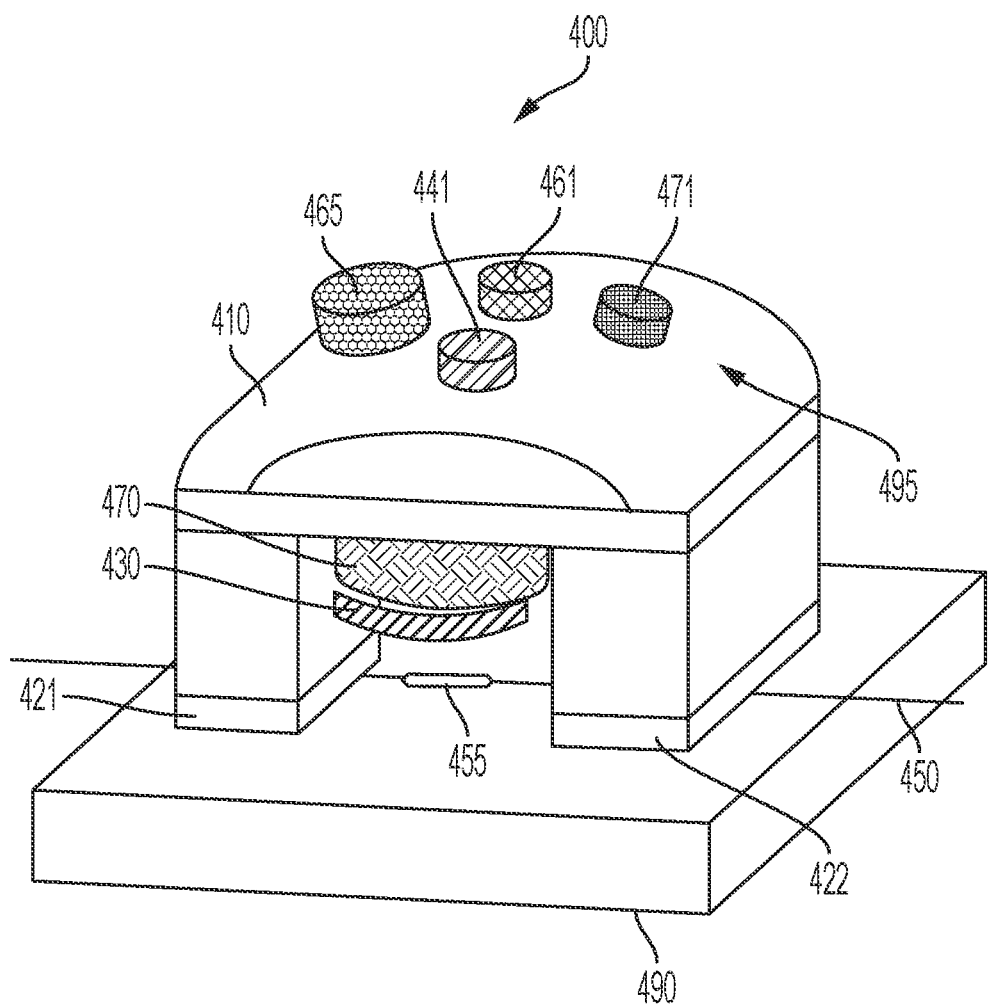
FIG. 4 is a conceptual diagram that provides a perspective view of an installation tool in accordance with embodiments described herein.

FIG. 4 is a conceptual diagram that provides a perspective view of an installation tool 400 in accordance with some embodiments. The installation tool 400 comprises a body 410 and one or more contact portions 421, 422 supported by the body 410 and configured to secure the optical fiber 450. As shown in FIG. 4, in some implementations, the optical fiber 450 being installed to the structure 490 may include an FO sensor 455. During the installation process, the optical fiber 450 is secured such that the FO sensor 455 is disposed between the contact portions 421, 422. Embodiments described herein may be used in conjunction with an adhesive stamp for installing an optical fiber to a structure. A stamp for installation of optical sensors is described in further detail in U.S. App. No. 17/235,123, which is incorporated by reference in its entirety.

The installation tool 400 further includes an adhesive dispenser 430 proximate the body 410. The adhesive dispenser 430 is capable of dispensing at least one adhesive. The adhesive dispenser 430 can be configured to dispense adhesive to one or more locations of the optical fiber 450 and/or the structure 490. According to some aspects, the installation tool 400 can be configured such that the adhesive dispenser 430 dispenses the adhesive to the optical fiber 450 and the structure 490 after the optical fiber 450 is secured by the contact portions 421, 422 and is pressed against the structure 490. The adhesive dispenser 430 may be configured to dispense adhesive to multiple locations of the optical fiber 450 and/or structure 490 during the time that the contact portions 422, 422 secure the optical fiber 450.

A dispenser controller (not shown) can be included to control the operation of the adhesive dispenser 430. For example, the dispenser controller may control the timing, type, flow rate, and/or amount of adhesive dispensed to one or multiple locations of the optical fiber 450.

Optionally, the installation device 400 includes a cure device 470 configured to generate a curing energy and to direct the curing energy toward the adhesive dispensed to the optical fiber 450 and the structure 490. In some embodiments, the installation device may implement a fully or partially automated process. In one example, after the installation process is initiated, e.g., by pressing a switch 465 on the body 410, the installation process proceeds with little or no interaction needed by the operator. In another example, the installation process may rely on the operator to initiate certain aspects of the installation process, e.g., by activating one or more switches 465, 461, 471, 441 that trigger one or more installation processes. Optionally, the installation device 400 is a hand-held device that includes a handle 495 configured to allow an operator to grasp the installation device 400. A stamp tool is described in further detail in U.S. App. No. 17/235,287, which is incorporated by reference in its entirety.

Figure 5:
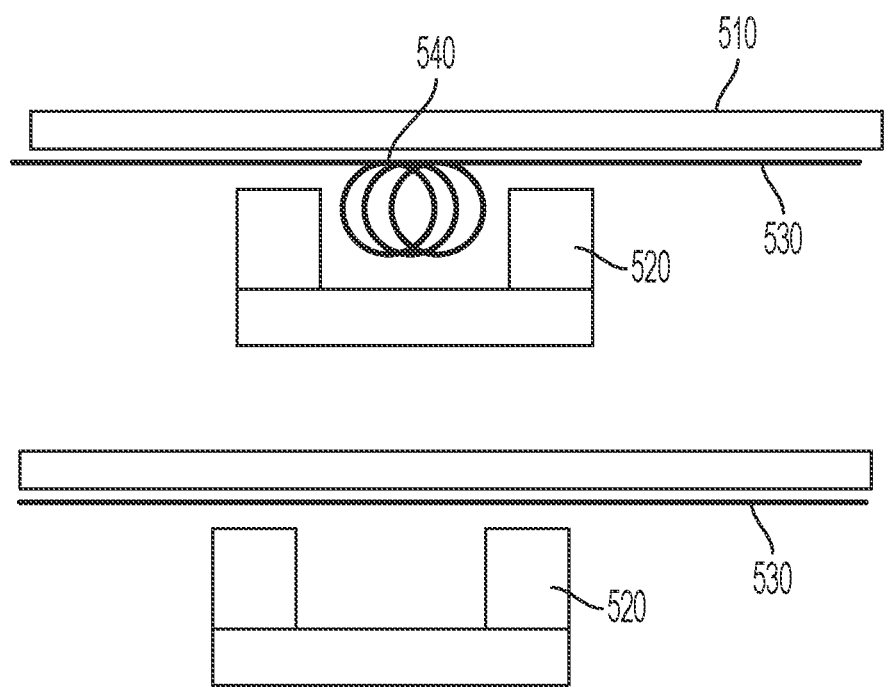
FIG. 5 shows the fiber installation tool that is configured to mount optical fiber to a surface of a structure to be monitored in accordance with embodiments described herein.

FIG. 5 shows the fiber installation tool 520 that is configured to mount optical fiber 530 to a surface of a structure 510 to be monitored. The installed fiber segment may contain or not contain a sensing point. In some cases, a fiber sub-spool 540 is configured to be installed to the structure 530 using the fiber installation tool 520.

Figure 6:
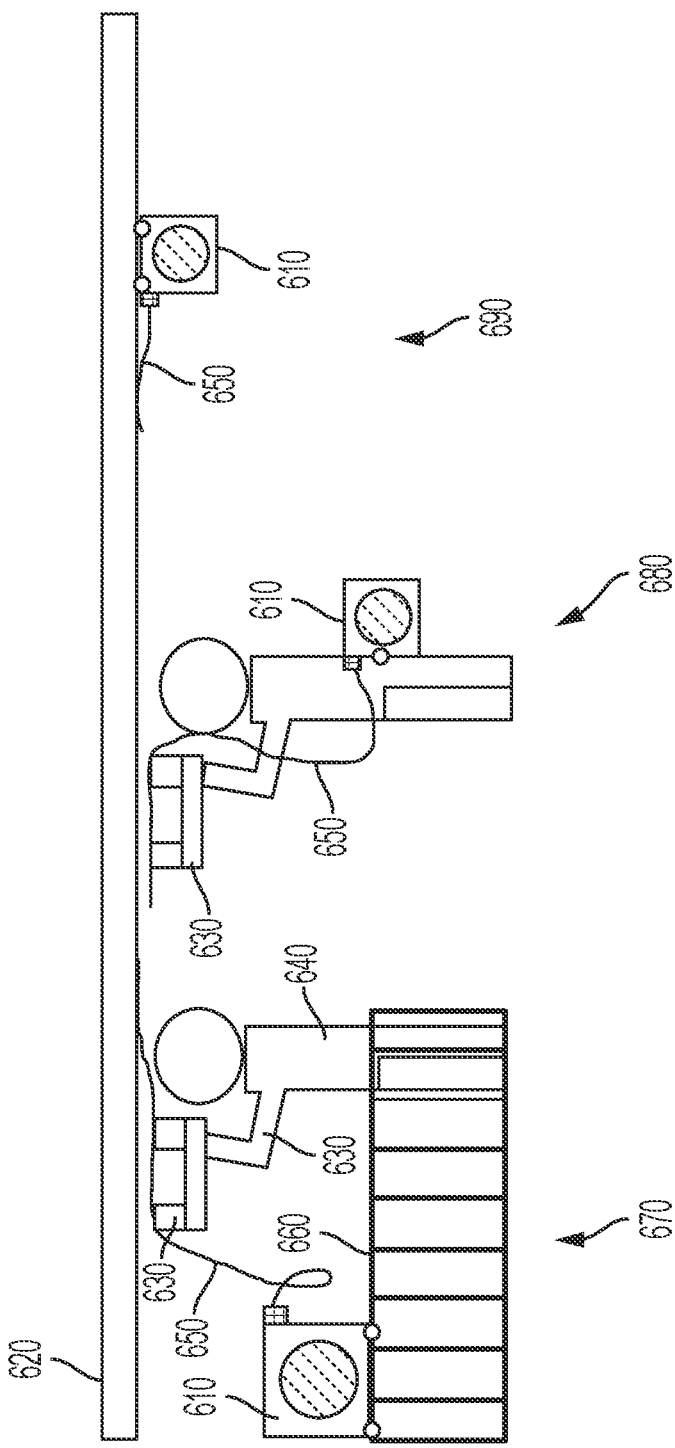
FIG. 6 shows examples of semi-automatic installation scenarios in accordance with embodiments described herein.

In a semi-automatic installation scenario, an operator 640 is involved that will operate the system as shown in FIG. 6. In some cases a boom lift 660 can be used and installation is onto the surface of a bridge, for example. In some cases, the fiber cassette 610 can be attached to the boom lift as shown in example 670. The installation tool 630 can be hand-held. The fiber cassette 610 may be able to spool in coordination with the movement of the boom lift 660 to reach an installation point. In some embodiments, the fiber cassette 610 will unspool the sensing fiber 650 and provide a signal when unspooled to a point that should be fixed to the structure 620 surface in order to perform sensing and/or to secure the fiber 650 and minimize fiber sag. The installation tool 630 can be used to hold a certain segment of the fiber 650 and position the fiber segment to the surface to be mounted. The cassette 610 may be able to spool/unspool accordingly to guarantee a certain fiber length between the fiber spool and the segment held by the installation tool 630 in order to position the segment onto the surface. Then the installation tool 630 may apply a mounting mechanism, which may fix the fiber segment to the surface. The mounting mechanism can be adhesive glues dispensed from and cured by the tool 630. The mounting mechanism can be fiber-mounting tapes dispensed from the tool 630, for example. Once a segment of the fiber is fixed to the surface, the segment can be released from the tool 630. The operator 640 can move on to the next installation point.

In some cases, the fiber cassette 610 can be carried by the operator 640 as the operator 640 moves from one installation point to another as shown in example 680. The fiber cassette 610 may be able to spool in coordination with the movement of the operator 640. Once an installation site is reached, the operator 640 can use the installation tool 630 to hold a certain segment of the fiber and position the fiber segment to the surface to be mounted. The cassette 610 may be able to spool/unspool accordingly to guarantee a certain fiber length between the cassette 610 and the segment held by the installation tool 630 in order to position the segment onto the surface. Then the installation tool 630 applies certain mounting mechanisms which fixes the fiber segment to the surface.

In some embodiments, the fiber cassette 610 can be temporarily attached to the structure 620 as shown in example 690. The cassette 610 may be monitored via its mounting points, while the operator 640 is adjusting the position of the boom lift 660 or preparing the next installation point.

Figure 7:
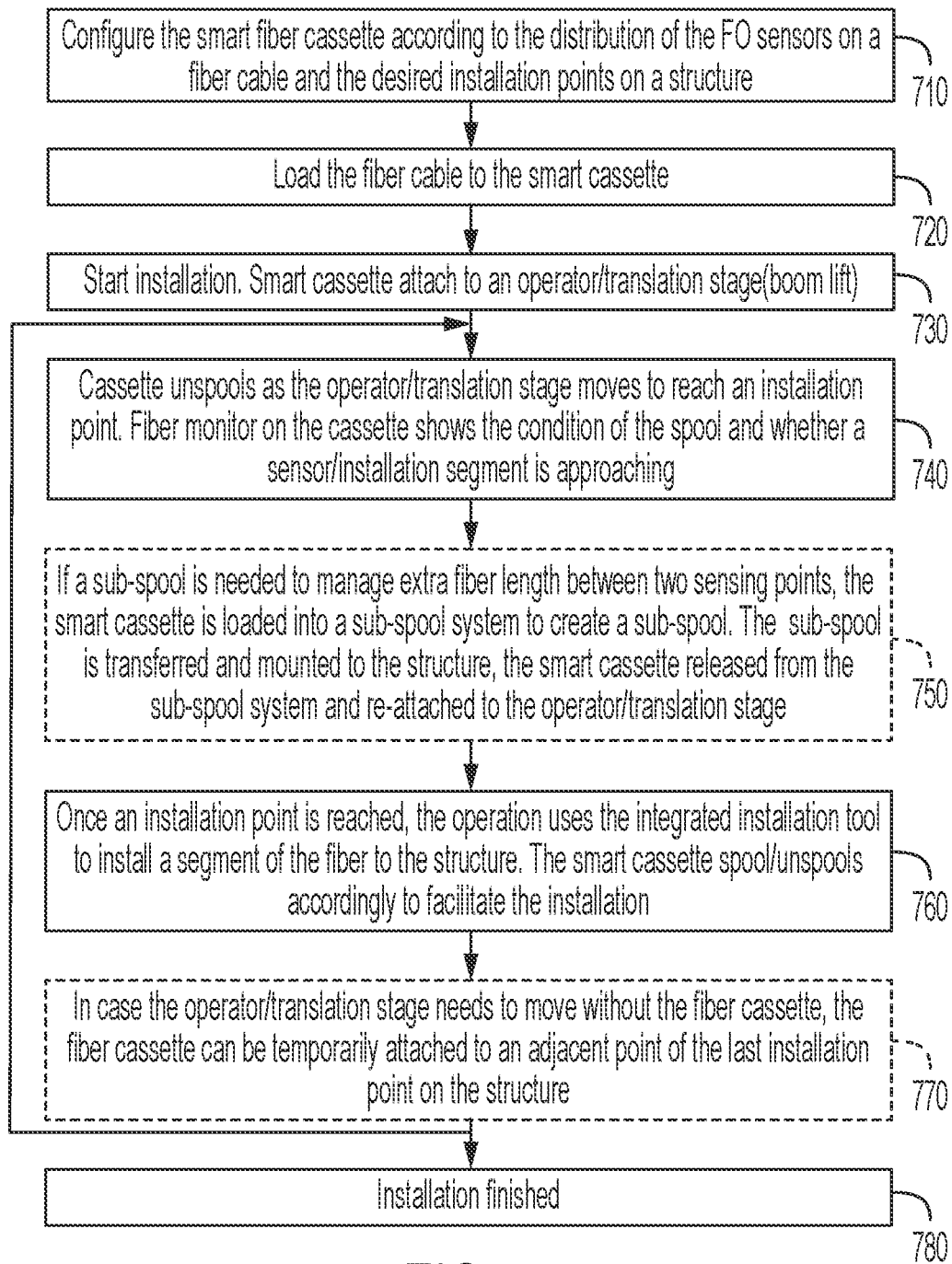
FIG. 7 shows a process for installing optical fiber to a structure in accordance with embodiments described herein.

FIG. 7 shows a process for installing optical fiber to a structure in accordance with embodiments described herein.

The smart fiber cassette is configured 710 according to the distribution of FO sensors on a fiber cable and the desired installation points on the structure. The fiber is loaded 720 onto the smart cassette. The installation starts and the smart cassette is attached 730 to an operator, structure, and/or a translation stage (e.g., boom lift). The cassette unspools 740 and the operator and/or the translation stage moves to reach the installation point. The fiber monitor on the cassette may show a condition of the spool and whether a sensor and/or installation point is approaching.

Optionally, if a sub-spool is desired to manage extra fiber length between two sensing points, the smart cassette may be loaded 750 into a sub-spool system to create a sub-spool. The sub-spool may be transferred and mounted to the structure. The smart cassette may be released from the sub-spool system and reattached to the operator and/or translation stage.

Once an installation point is reached, the integrated installation tool may be used 760 to install at least a segment of the optical fiber to the structure. The smart cassette may be configured to spool and/or unspool to facilitate the installation. In the event that the operator and/or translation stage needs to move without the fiber cassette, optionally, the fiber cassette can be temporarily attached 770 to an adjacent point of the last installation point on the structure. In some cases, the optical fiber may be pre-strained prior to installation. A tool that can be used to pre-strain the optical fiber is described in further detail in U.S. App. No. 17/235,101, which is incorporated by reference in its entirety. The installation may be finished 780 once all of the desired optical fiber is installed onto the structure.

Figure 8A:
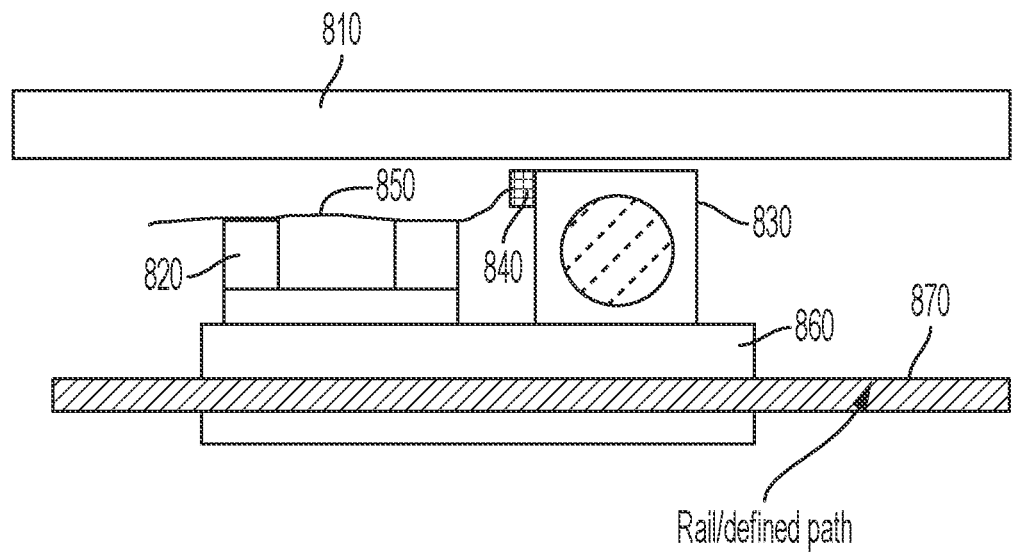
FIG. 8A illustrates automatic installation of the optical fiber using an installation robot in accordance with embodiments described herein.

In some cases, the installation of the optical fiber may be automatically installed using an installation robot as shown in FIG. 8A. In an automatic installation case, all the aforementioned components can be integrated into a fiber installation robot 860. The robot 860 can travel along a defined path 870 on the surface of the structure 810, e.g., a preinstalled rail. The smart fiber cassette 830 having an integrated fiber monitor 840 dispenses the fiber as the robot 860 moves and the fiber mounting module 820 fixes the fiber 850 to the surface at specific points. In some cases, the robot 860 can create sub-spools whenever needed and transfer the sub-spool to the surface and fix it in place.

Figure 8B:
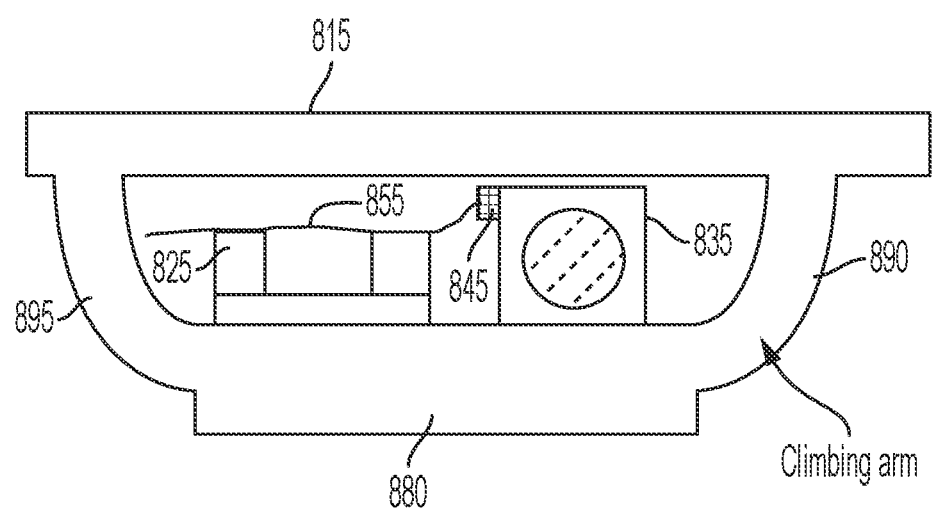
FIG. 8B shows automatic installation of the optical fiber using an installation robot having climbing arms in accordance with embodiments described herein.

FIG. 8B shows another example of a fiber installation robot that shows climbing arms in accordance with embodiments described herein. The robot 880 can climb on the structure 815 and move along a programed path using climbing arms 890, 895. The smart fiber cassette 835 may have an integrated fiber monitor 845 dispenses the fiber as the robot 880 moves and the fiber mounting module 825 fixes the fiber 855 to the surface at specific points.

Figure 9:
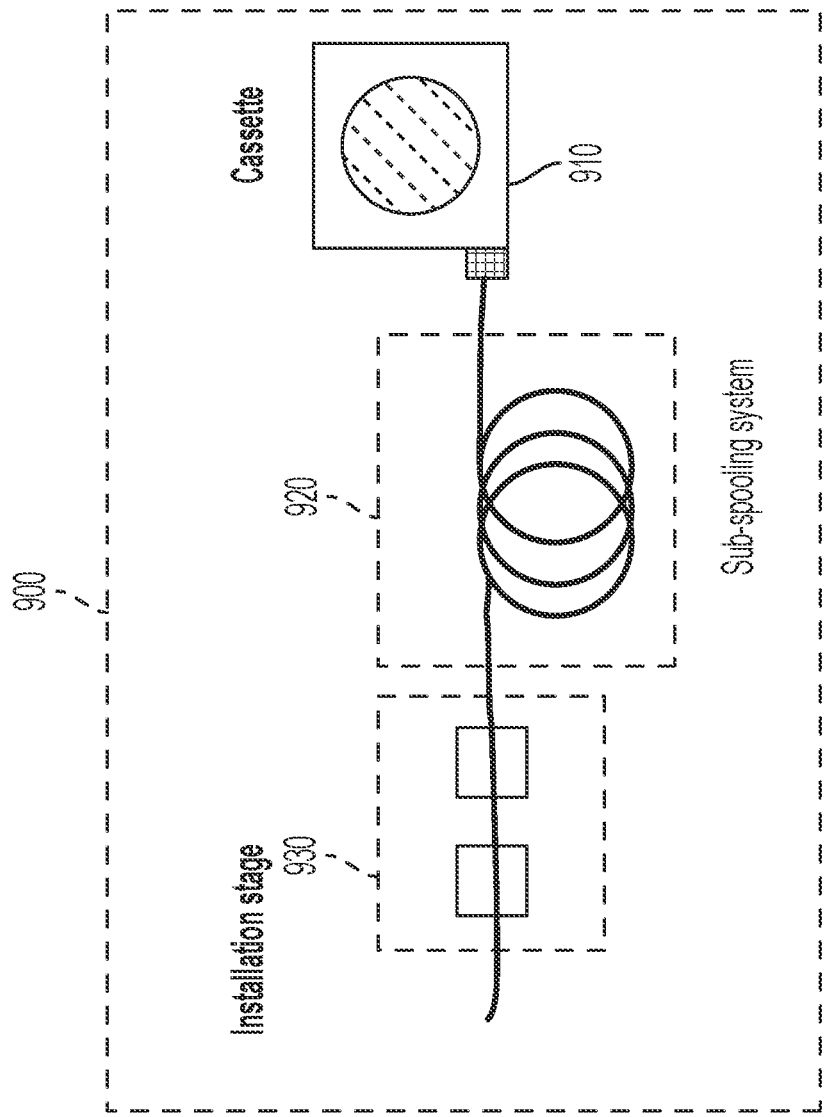
FIG. 9 illustrates an example of a system incorporating the fiber cassette in and the sub-spooling system in accordance with embodiments described herein.

FIG. 9 illustrates an example of a system 900 incorporating the fiber cassette 910 in and the sub-spooling system 920 in accordance with embodiments described herein. A sub spool can be fixed by UV glue/spiral coil at several points to maintain its shape after being released from the sub-spooling system with the installation tool 930. The sub spool can then be transferred and mounted to the structure surface. The fiber cassette can be detached from the sub-spooling system once a sub spool is created and transferred.

Figure 10:
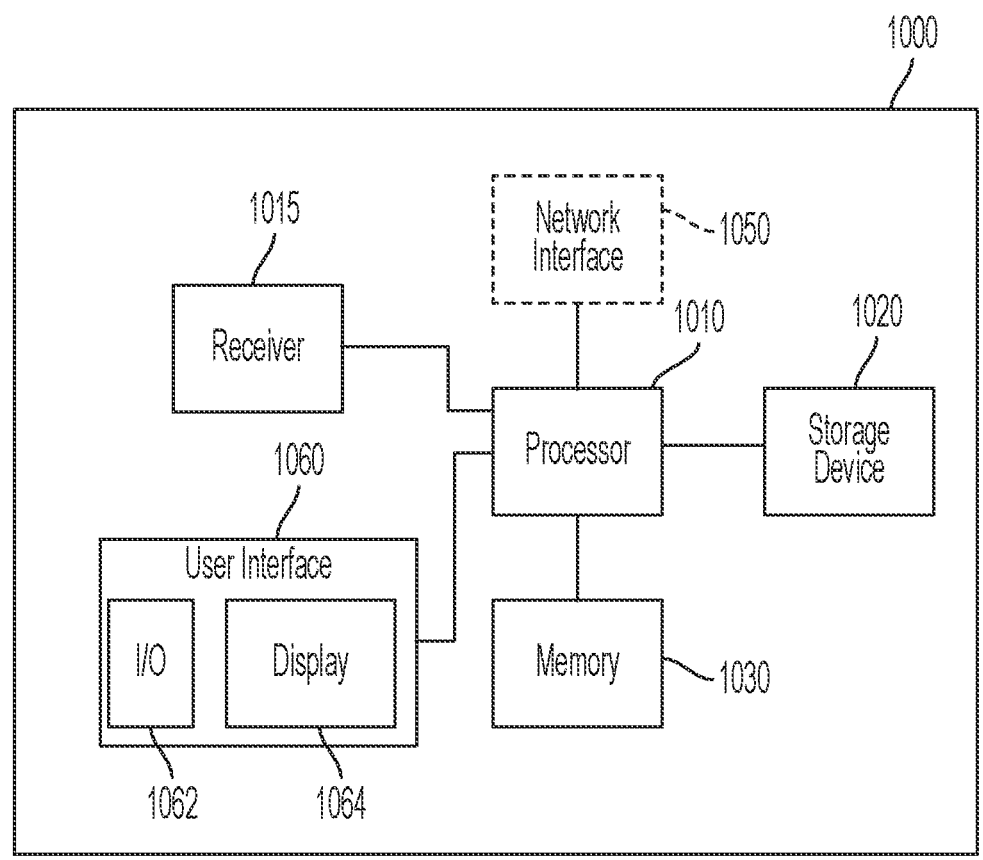
FIG. 10 shows an example computer capable of executing the methods described herein.

The systems described herein can be implemented by a computer using well-known computer processors, memory units, storage devices, computer software, and other components. A high-level block diagram of such a computer is illustrated in FIG. 10. Computer 1000 contains a processor 1010, which controls the overall operation of the computer 1000 by executing computer program instructions which define such operation. It is to be understood that the processor 1010 can include any type of device capable of executing instructions. For example, the processor 1010 may include one or more of a central processing unit (CPU), a graphical processing unit (GPU), a field-programmable gate array (FPGA), and an application-specific integrated circuit (ASIC). The computer program instructions may be stored in a storage device 1020 and loaded into memory 1030 when execution of the computer program instructions is desired. Thus, the steps of the methods described herein may be defined by the computer program instructions stored in the memory 1030 and controlled by the processor 1010 executing the computer program instructions. The computer 1000 may include one or more network interfaces 1050 for communicating with other devices via a network. The computer 1000 also includes a user interface 1060 that enable user interaction with the computer 1000. The user interface 1060 may include I/O devices 1062 (e.g., keyboard, mouse, speakers, buttons, etc.) to allow the user to interact with the computer. Such input/output devices 1062 may be used in conjunction with a set of computer programs in accordance with embodiments described herein. The user interface may include a display 1064. The computer may also include a receiver 1015 configured to receive data from the user interface 1060 and/or from the storage device 1020. According to various embodiments, FIG. 10 is a high-level representation of possible components of a computer for illustrative purposes and the computer may contain other components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art.

The foregoing description of the example embodiments have been presented for the purposes of illustration and description. It is not intended to be exhaustive or to limit the inventive concepts to the precise form disclosed. Many modifications and variations are possible in light of the above teachings. Any or all features of the disclosed embodiments can be applied individually or in any combination, not meant to be limiting but purely illustrative. It is intended that the scope be limited by the claims appended herein and not with the detailed description.

What is claimed is:

1. An apparatus, comprising:
a cassette configured to hold optical fiber comprising one or more optical sensors, the cassette comprising a spool configured to one or more of extract and retract the optical fiber from the cassette;
a pre-strain mechanism configured to apply a predetermined pre-strain to the one or more optical sensors;
an optical fiber installation tool configured to mount the optical fiber comprising the one or more pre-strained optical sensors to a surface; and
a fiber monitor coupled to the cassette, the fiber monitor configured to monitor at least one parameter of the optical fiber as the optical fiber is extracted from the cassette.

2. The apparatus of claim 1, wherein the one or more optical sensors comprise one or more fiber Bragg grating (FBG) sensors.

3. The apparatus of claim 1, wherein the cassette further comprises:
an adjustable shaft disposed such that the spool is configured to rotate about the adjustable shaft, the adjustable shaft configured to handle spools having different diameters; and
a spool controller coupled to the adjustable shaft and configured to rotate the adjustable shaft to perform one or more of extract and retract the optical fiber.

4. An apparatus, comprising:
a cassette configured to hold optical fiber comprising one or more optical sensors, the cassette comprising a spool configured to one or more of extract and retract the optical fiber from the cassette;
a pre-strain mechanism configured to apply a predetermined pre-strain to the one or more optical sensors;
an optical fiber installation tool configured to mount the optical fiber comprising the one or more pre-strained optical sensors to a surface, wherein the optical fiber installation tool comprises:
a body;
one or more contact portions supported by the body and configured to secure the optical fiber;
an adhesive dispenser proximate the body, the adhesive dispenser configured to dispense at least one adhesive to the optical fiber and the surface; and
a dispenser controller operatively coupled to the adhesive dispenser, the dispenser controller configured to control the adhesive dispenser.

5. The apparatus of claim 1, wherein the at least one parameter comprises at least one of a spooling length, a spooling condition, a total length dispensed, an approximate distance to an optical sensor, a fiber tension, and a fiber integrity.

6. The apparatus of claim 1, wherein the optical fiber installation tool comprises:
a body;
one or more contact portions supported by the body and configured to secure the optical fiber;
an adhesive dispenser proximate the body, the adhesive dispenser configured to dispense at least one adhesive to the optical fiber and the surface; and
a dispenser controller operatively coupled to the adhesive dispenser, the dispenser controller configured to control the adhesive dispenser.

7. The apparatus of claim 6, wherein:
the contact portions comprise switchable contact portions that are switchable between a first state that secures the optical fiber and a second state that releases the optical fiber; and
further comprising a contact switch configured to switch the switchable contact portions between the first and second states.

8. The apparatus of claim 7, wherein:
the adhesive is a curable adhesive; and
further comprising:
- a curing device configured to provide a curing energy directed toward the curable adhesive after the curable adhesive is dispensed; and
- a curing device controller coupled to the curing device.

9. The apparatus of claim 6, wherein the adhesive dispenser is configured to dispense:
- a first adhesive configured to form a fast bond between the optical fiber and the surface; and
- a second adhesive configured to form a slow bond between the optical fiber and the structure.

10. The apparatus of claim 1, further comprising a sub-spooling system configured to spool fiber released from the cassette.

11. A method of installing optical fiber on a structure, comprising:
- loading optical fiber comprising one or more optical sensors on a cassette;
- unspooling the optical fiber as the cassette moves along a surface of the structure;
- monitoring a condition of the optical fiber as it is being unspooled;
- determining whether an installation point is approaching based on the monitoring; and
- installing a segment of the optical fiber to the surface based on a determination that the installation point is approaching.

12. The method of claim 11, further comprising pre-straining the optical fiber before installing the segment of the optical fiber to the structure.

13. The method of claim 11, further comprising loading the cassette into a sub-spool system to create a sub-spool of optical fiber before installing the segment of the optical fiber to the structure.

14. The apparatus of claim 4, wherein the one or more optical sensors comprise one or more fiber Bragg grating (FBG) sensors.

15. A system for installing optical fiber, comprising:
- a cassette configured to hold optical fiber comprising one or more optical sensors, the cassette comprising a spool configured to one or more of extract and retract the optical fiber from the cassette;
- a fiber monitor coupled to the cassette, the fiber monitor configured to monitor at least one parameter of the optical fiber as the optical fiber is extracted from the cassette; and
- an optical fiber installation tool configured to mount the optical fiber comprising the one or more optical sensors to a surface.

16. The system of claim 15, further comprising a fiber installation robot configured to automatically install the optical fiber to the surface.

17. The system of claim 16, wherein the robot is configured to move along the surface along a defined path.

18. The system of claim 17, wherein the robot comprises one or more climbing arms configured to move the robot along the defined path.

19. The system of claim 16, wherein the robot is configured to create a sub-spool of the optical fiber and transfer the sub-spool to the surface.

* * * * *